(12) United States Patent
Ogle et al.

(10) Patent No.: US 6,430,604 B1
(45) Date of Patent: Aug. 6, 2002

(54) TECHNIQUE FOR ENABLING MESSAGING SYSTEMS TO USE ALTERNATIVE MESSAGE DELIVERY MECHANISMS

(75) Inventors: David Mark Ogle, Cary; Diane Phylis Pozefsky, Chapel Hill; Robert Joseph Sundstrom, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,915

(22) Filed: Aug. 3, 1999

(51) Int. Cl.$^7$ .............................................. G06F 13/00
(52) U.S. Cl. ...................... 709/207; 709/203; 709/217; 709/218; 709/219
(58) Field of Search ................................. 709/200, 201, 709/203, 206, 207, 212, 213, 214, 215, 216, 217, 218, 219, 227, 229

(56) References Cited

U.S. PATENT DOCUMENTS

| | | | |
|---|---|---|---|
| 5,091,790 A | * 2/1992 | Silverberg | 358/434 |
| 5,428,663 A | * 6/1995 | Grimes et al. | 340/7.21 |
| 5,761,277 A | * 6/1998 | Fladare et al. | 379/221.05 |
| 5,781,614 A | * 7/1998 | Brunson | 379/88.14 |
| 5,802,470 A | * 9/1998 | Gaulke et al. | 455/426 |
| 6,041,114 A | * 3/2000 | Chestnut | 379/211.02 |
| 6,075,844 A | * 6/2000 | Goldberg et al. | 379/88.17 |
| 6,175,859 B1 | * 6/2001 | Mohler | 709/206 |
| 6,272,339 B1 | * 8/2001 | Wiedeman | 455/426 |

FOREIGN PATENT DOCUMENTS

WO  9948011  9/1999

* cited by examiner

Primary Examiner—Moustafa M. Meky
(74) Attorney, Agent, or Firm—Jeanine S. Ray-Yarletts; Marcia L. Doubet

(57) ABSTRACT

A method, system, and computer program product for enabling messaging systems to use alternative message delivery mechanisms. In existing instant messaging systems, messages cannot be delivered to an intended recipient unless the recipient is currently logged on to an instant messaging system. According to the present invention, users may register one or more alternative message delivery mechanisms (such as pagers, cell phones, etc.) through which they are available as an alternative to an instant messaging system. Constraints may optionally be added to these registered alternatives, such as specifying a limitation on days of the week and/or hours of the day when a particular alternative may be used. Providing that an alternative messaging mechanism is registered, and any constraints for this alternative are satisfied, in the first preferred embodiment the extended IMS will select a suitable alternative and deliver the message. In a second and third preferred embodiment, the sender of the "instant" message will be informed of the available alternative(s). The sender may then choose to have his message delivered even though the intended receiver is not currently logged on to an instant messaging system. Fourth and fifth embodiments enable a message to be delivered to a recipient using a registered mechanism (that may include an IMS), and provide for determining availability of a selected user. Using these techniques, the real-time awareness of potential message receivers in instant messaging systems is extended.

35 Claims, 11 Drawing Sheets

FIG. 3

Registry 300

| User 301 | Mechanism 302 | Status/Constraints 303 |
|---|---|---|
| 310  311 Dave Smith | 313 312 Pager  dsmith@skytel.com<br>315 314 Cellular  919-555-1212 | 317 316 In 24 hours per day<br>319 318 In 9 am to 5 pm |
| 320  321 Doug Jones | 323 322 Pager  djones@skytel.com<br>325 324 Phone  919-555-1212 | 327 326 In 9 am to 5 pm<br>329 328 Out 8 am to 6 pm |
| 330  331 Bob Johnson | 333 332 email  bobj@aol.com | 337 336 In 24 hours per day |
| 340  341 Dan Harris | 343 342 PalmPilot  danh@palm.com | 347 346 In 8 am to 12 am |

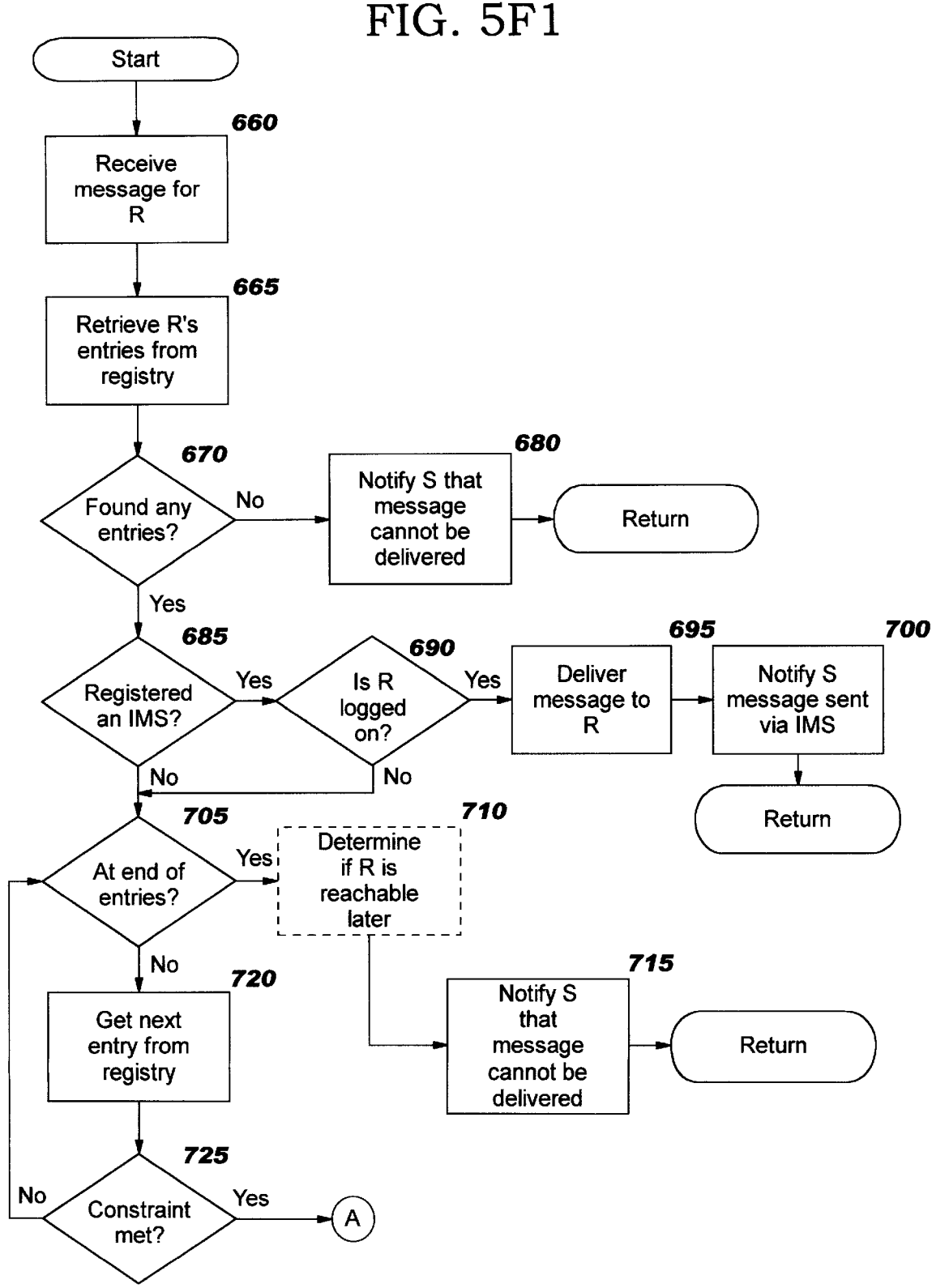
FIG. 5F1

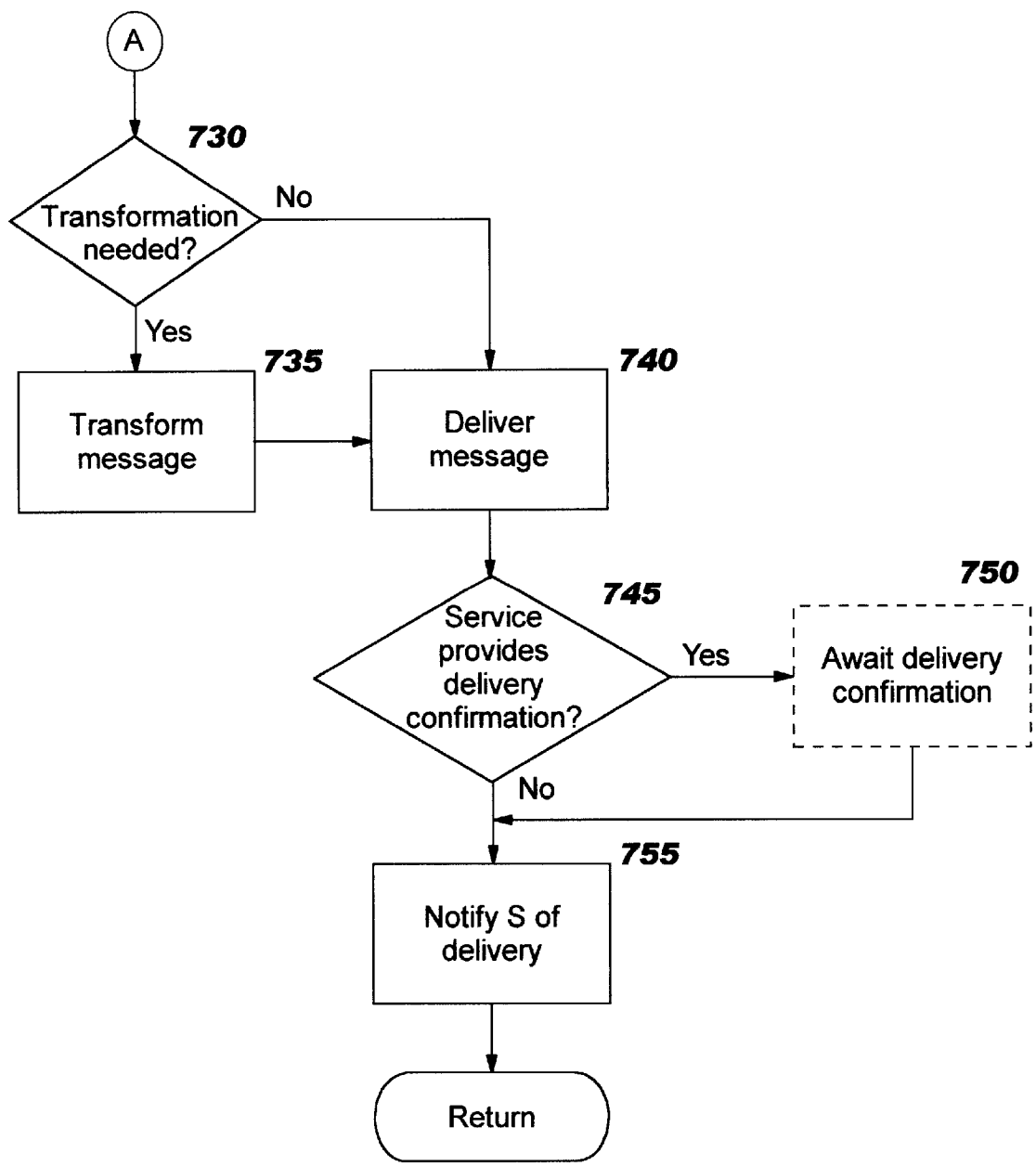
FIG. 5F2

TECHNIQUE FOR ENABLING MESSAGING SYSTEMS TO USE ALTERNATIVE MESSAGE DELIVERY MECHANISMS

BACKGROUND OF THE INVENTION

1. Field of the Invention

The present invention relates to a computer system, and deals more particularly with a method, system, and computer program product for enabling messaging systems to use alternative message delivery mechanisms. Use of this technique extends the real-time awareness aspect of instant messaging, so that messages may still be delivered from a sender using an instant messaging system even though the intended receiver is not currently logged on to an instant messaging system (but is otherwise available), or to deliver a message from a sender using a wireless messaging service via a mechanism for which a recipient has registered his availability.

2. Description of the Related Art

Instant messaging systems provide for instant, real-time communication between users who are connected to the system through an on-line or electronic networking environment. Examples of instant messaging systems include Yahoo!®Messenger, AOL Instant Messenger$^{SM}$, and Sametime™. ("Yahoo!" is a registered trademark of Yahoo! Inc., "AOL Instant Messenger" is a service mark of America Online, Inc., and "Sametime" is a trademark of Lotus Development Corporation.) Such systems are becoming quite popular among users of networks such as the Internet, World Wide Web (hereinafter, "Web"), and internal intranets because they are easy to use and provide a simple way for one user to send a message to another user.

Instant messaging systems provide real-time awareness of who is logged on. Typically, an instant messaging system (hereinafter, "IMS") user has an address book containing names or nicknames for those people with whom he communicates. The entries in this address book are used for selecting a message recipient. The IMS typically indicates, using a visual cue (such as different icons or different fonts), which of the people are logged on to the system and which are not. For a message to be sent from a sending user to a receiving user, both users must be currently logged on to an IMS (which may be the same IMS, or a different IMS). Otherwise, the system will not allow the sender to send his message. By ensuring that the receiver is available when a message is sent to him, the message can be delivered and presented to the recipient nearly instantly (depending on network delay).

Instant messaging systems are distinguished from e-mail systems in that e-mail is not real-time in nature. E-mail systems merely accept electronic messages, and store them for delivery. There is no real-time awareness of whether the message recipient is currently logged on and able to receive the message. Instead, the message is stored until such time as the user logs on to the e-mail system and receives his waiting messages.

There may be a number of situations where the all-or-nothing approach used by instant messaging systems is unwarranted. For example, it may happen that a recipient's status changes during an on-going communication. In this situation, a sender may be busily typing a message to the recipient, only to find out that the recipient has gone off-line—and the message is thus rejected by the IMS. Rather than completely discarding the sender's message, it would be preferable to provide an alternative technique for delivering the message. In many cases the sender's message is not time-critical, and a delivery mechanism other than the instant messaging system (such as sending the message by e-mail instead of with the IMS) may be suitable to the sender. Selection of an alternative delivery mechanism is not an option of existing instant messaging systems. As yet another example, the recipient may be reachable by an alternative communication mechanism (such as a cellular phone, pager, etc.), even though he is not currently reachable by an IMS. Existing instant messaging systems do not provide users the ability to send messages to such recipients; instead, the sender must choose between not sending the message or physically changing to a different message-delivery system (such as leaving his computer to make a phone call to the recipient, and delivering the message in this manner). Both options are inconvenient and inefficient for users.

Wireless messaging systems such as 2-way paging systems and text messaging services using digital cellular telephone networks are also becoming pervasive. These wireless systems have some of the same characteristics of instant messaging systems. These wireless systems also have a number of drawbacks regarding message delivery. For example, if a particular user receives messages on a 1-way pager, and another user sends a message to this person, the message will not be received if the pager is turned off. Or, if a user has a 2-way pager, he may not receive a sender's message in a timely manner. That is, if his pager is turned off when the message is sent, he will not receive it until he later turns the pager back on. Also, current wireless messaging systems do not interwork with instant messaging systems, and do not provide the real-time awareness attribute that is a key benefit of an IMS.

Accordingly, a need exists for a technique by which messaging systems can be extended to provide their users with the ability to use alternative message delivery mechanisms, such that (i) in the case of an IMS-based sender, messages can be accepted for and delivered to a recipient even though he is not currently logged on to an IMS, and (ii) in the case of a sender using a wireless messaging system, the sender's message may be sent based on an awareness of how the recipient is currently reachable.

SUMMARY OF THE INVENTION

An object of the present invention is to provide a technique to extend the message delivery capabilities of messaging systems.

Another object of the present invention is to provide this technique by enabling messages to be sent from instant messaging systems to users who are reachable through alternative delivery mechanisms, such that messages can be accepted for and delivered to a recipient even though he is not currently logged on to an IMS.

It is a further object of the present invention to provide this technique in a manner that operates according to user preferences.

Yet another object of the present invention is to extend the real-time awareness aspect of wireless messaging systems by enabling a sender to determine a message recipient's availability.

Still another object of the present invention is to enable messages to be sent in a wireless environment based on alternative delivery mechanisms for which a recipient has registered his availability.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for use in a computing environment, for enabling an instant messaging system (IMS) to use alternative message delivery mechanisms. In one embodiment, this technique comprises: providing a registry comprising an entry for at least one of one or more message recipients, wherein each of the entries comprises: (i) an alternative message delivery mechanism, and (ii) addressing information for the alternative; receiving, from a message sender, a message to be delivered to a selected one of the message recipients; determining, by the IMS, whether the selected one is currently logged on to the IMS or another IMS; delivering the message to the selected one when the determining has a positive result; and forwarding the message on a particular alternative delivery mechanism associated with the recipient when the determining has a negative result and when the particular mechanism is available.

The forwarding preferably further comprises: retrieving an associated entry from the registry using an identifier of the selected one; and delivering the message to an address of the particular mechanism from the retrieved entry. Each entry in the registry may further comprise a constraint associated with the alternative message delivery mechanism, this constraint specifying a condition for use of the associated mechanism, and the forwarding may further comprise: verifying whether the condition from the retrieved entry is met; and determining that the particular mechanism is available only when the condition is met. The message may be rejected when the particular mechanism is not available.

Or the forwarding process may further comprise notifying the sender of the particular alternative, wherein this forwarding process further requires that the sender accept the particular alternative.

In another embodiment, this technique comprises: providing a registry comprising an entry for at least one of one or more message recipients, wherein each of the entries comprises: (i) one or more an alternative message delivery mechanisms, and (ii) addressing information for each of the alternatives; receiving, from a message sender, a message to be delivered to a selected one of the message recipients; determining, by the IMS, whether the selected one is currently logged on to the IMS or another IMS; delivering the message to the selected one when the determining has a positive result; and forwarding the message on a particular alternative delivery mechanism associated with the recipient when the determining step has a negative result and when the particular mechanism is available.

In this embodiment, the forwarding preferably further comprises: retrieving an associated entry from the registry using an identifier of the selected one; and delivering the message to an address of the particular mechanism from the retrieved entry. Each entry in the registry may further comprise a constraint associated with each of the alternative message delivery mechanisms, each of these constraints specifying a condition for use of the associated mechanism, and the forwarding step may further comprise: iteratively evaluating each of the conditions from the retrieved entry until locating a match; and using the mechanism associated with the matched condition as the particular mechanism. The message may be rejected when none of the conditions are met.

The technique of this embodiment may further comprise: presenting available ones of the alternative delivery mechanisms to the sender when the determining has the negative result; enabling the sender to select from the presented ones; and using, by the forwarding, the selected one as the particular mechanism.

Alternatively in this embodiment, the forwarding process may further comprise selecting an available one of the registered alternative delivery mechanisms associated with the recipient, and notifying the sender of the available one, wherein the forwarding process further requires that the sender accept the available one.

This embodiment may also further comprise: receiving a multiple-recipient message from the sender, wherein the multiple-recipient message is to be delivered to more than one of the message recipients; and wherein: the determining whether the selected one is currently logged on process determines whether each of the message recipients is currently logged on to the IMS; the delivering the message when the determining has the positive result process delivers the message to each of the message recipients who is currently logged on; and when the determining process has the negative result, the forwarding the message on the particular alternative delivery mechanism process forwards the message to each of the message recipients who is not currently logged using an available mechanism associated with each of the not-logged-on message recipients.

The present invention will now be described with reference to the following drawings, in which like reference numbers denote the same element throughout.

BRIEF DESCRIPTION OF THE DRAWINGS

FIG. 3 depicts a sample registry of alternative message delivery mechanisms that may be used with the present invention;

FIGS. 5A–5G illustrate flow charts which set forth the logic which may be used to implement the preferred embodiments of the present invention.

DESCRIPTION OF THE PREFERRED EMBODIMENTS

Figure 1:
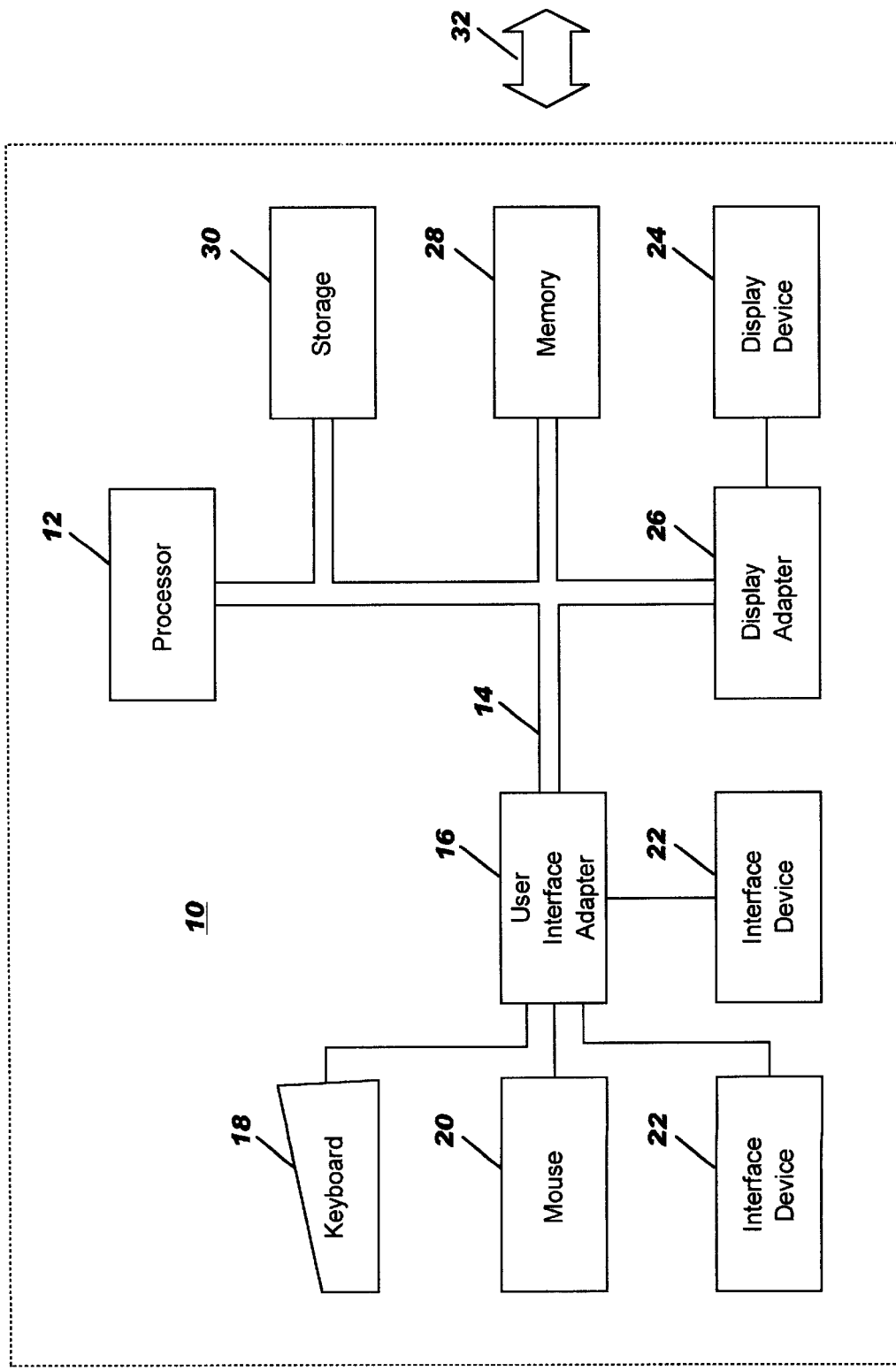
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
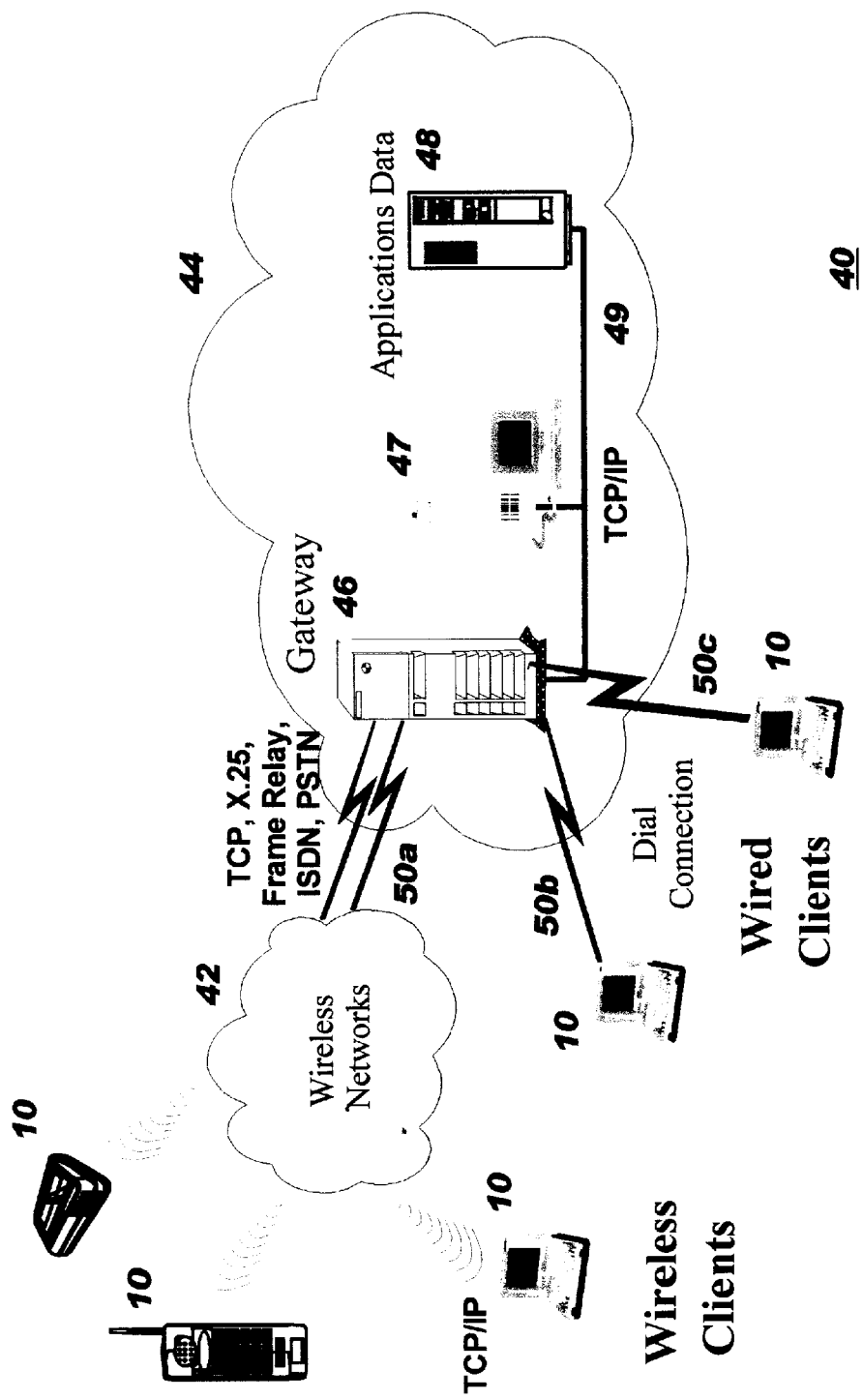
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP"), AppleTalk®, or SNA over a number of alternative connection media, such as cellular phone, radio frequency networks, satellite networks, etc. ("AppleTalk" is a registered trademark of Apple Computer, Inc.) The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A sender's computer, when using the present invention, may be connected to a server embodying an IMS using a wired connection, or a wireless connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The sender's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the sender's computer will be referred to equivalently as a "workstation", "machine", "device", or "computer", and use of any of these terms or the term "server" refers to any of the types of computing devices described above.

In the preferred embodiments, the present invention is implemented as one or more modules (also referred to as code subroutines, or "objects" in object-oriented programming) of a computer software program (or programs) which provides instant messaging capabilities. The invention may be used with instant messaging systems in an Internet environment. Alternatively, the environment may be a corporate intranet, an extranet, or any other network environment. The program code of the preferred embodiment may be implemented as objects in an object-oriented programming language, or in a conventional procedurally-oriented language, or in a mix of object-oriented and procedural language code. In the first preferred embodiment, the code of the present invention operates on the server. In the second, third, and fifth preferred embodiments, the code of the present invention operates partially on a server and partially on the sender's machine (for example, by using recipient availability information received from a server to generate a graphical representation for local use by a sender, as will be described in detail below). In the fourth preferred embodiment, the code of the present invention operates primarily on a server, with message feedback information preferably presented on the sender's machine.

Assume a user "S" wants to send a message "M" to a recipient "R". Prior art instant messaging systems determine whether R is logged on to an IMS at the time, and present an awareness of this information to the sender S. If R is not logged on, the IMS prevents S from sending message M. The present invention extends instant messaging systems to enable use of other forms of communications for message delivery, such that message sender S is able to send message M to recipient R even though that recipient is not currently logged on to an IMS.

Alternatively, suppose sender S is using a wireless device, and does not have access to an IMS. Instead, S uses a wireless messaging service such as a paging network, digital cellular system, etc. As described earlier, S may send a message to R which R never receives, or which R receives in an untimely manner. The present invention defines extensions for wireless messaging systems, where this extended system is referred to herein as an "Extended Messaging System" or "EMS". This EMS is directed toward providing real-time recipient awareness to senders, and enabling use of alternative delivery mechanisms. This EMS enables the sender to either know in advance which delivery mechanism will be used, or to be notified after-the-fact as to what mechanism was used, as will be further described below.

According to the first three embodiments of the present invention, a user of an IMS who chooses to receive messages through alternative delivery mechanisms registers the type of mechanism(s)—such as a pager, cell phone, screen phone, regular phone, personal digital assistant (PDA), e-mail system, etc.—through which that user is available as an alternative. In addition to determining those users who are currently logged on to an IMS, these three embodiments of the present invention enable the IMS to extend its awareness of reachable users by consulting the registry (which may be, for example, a database or other storage facility) where the user's information is stored. Constraints or preferences may optionally be added to a registered alternative, such as specifying a limitation on days of the week and/or hours of the day when a particular alternative may be used. As an example of an alternative messaging mechanism, suppose R has a 2-way pager, and wants to be considered as "reachable" through this pager at times when he is not logged on to an IMS. R may then register that he can be reached by the pager, where information necessary for contacting R through his pager (such as his user identification, and the paging system to which he subscribes) is specified as part of the registered information.

In the fourth and fifth embodiments, users similarly register alternative message delivery mechanisms through which they available, with or without constraints. Notably, these alternatives may include specification of some IMS through which a user can be reached, such that a message from a non-IMS-based sender may be received by a recipient using his IMS.

The preferred embodiments of the present invention will now be discussed in more detail with reference to FIGS. 3 through 5.

FIG. 3 depicts an illustration of alternative messaging mechanisms which have been registered according to the preferred embodiments of the present invention. This example registry 300 contains entries 310, 320, 330, 340 for four IMS users 311, 321, 331, 341. This registered information is depicted in tabular form for purposes of illustration, although it will be obvious to one of skill in the art that a number of alternative storage formats (such as entries in a directory or relational database) may be used without deviating from the inventive concepts disclosed herein. Further, a number of techniques for creating the registry may be used, which will be obvious to one of skill in the art. For ease of reference, the entries in this example registry will be discussed in terms of registration for use with an IMS-based sender, although this registry applies equivalently for the non-IMS-based EMS of the fourth and fifth embodiments.

A user name 301 (or other suitable identifier, such as a unique user account number) for each user is used to store, and later locate, entries in the registry 300. An example of registering that a user is reachable using a pager, and the contact information for the pager, is shown for user 311 at elements 312 and 313 of a mechanism registration 302 entry. User 321's registration also specifies a pager device 322 and pager contact information 323. In a first optional aspect of the preferred embodiments, a particular IMS user may register more than one alternative messaging mechanism, as has been shown by additional entries for a cellular phone 314 (for user 311) and a regular phone 324 (for user 321). When a phone entry is registered, the phone number by which the user can be reached is also registered (as shown at elements 315 and 325). In this example registry, user 331 is only reachable by e-mail as an alternative to an IMS, as indicated by the single mechanism registration entry specifying e-mail (element 332) and an e-mail address (element 333). User 341 is also reachable by a single alternative, shown at 342 as a PalmPilot® device, where this user is reachable with the registered address shown at 343. ("PalmPilot" is a registered trademark of 3Com Corporation.)

In a second optional aspect of the preferred embodiments, constraints may be used to limit the use of an alternative mechanism. For example, user R may not wish to receive messages on his pager (or other somewhat disruptive devices such as regular telephones, screen phones or cell phones) between the hours of 11 p.m. and 8 a.m. For this second optional aspect, the availability of a user at a particular registered alternative may be indicated in the registry in a number of ways. Preferably, each registered mechanism entry 302 has an associated constraint or status 303. The value in this status entry 303 may be specified using one of several approaches. In a first approach, the registered status entry 303 associated with the alternative may be left unspecified to indicate the absence of any constraints (i.e. that this alternative is always available). Or, when constraints are to be applied with this first approach, they may be interpreted in either a positive or a negative sense (that is, a specification of when this alternative is available or when it is unavailable, respectively). The example registry 300 in FIG. 3 illustrates another approach, where each status entry 303 is comprised of two parts. The first part is a status indication, which is used to explicitly specify the interpretation of the constraint. This indication has the value "In" for registered mechanism entries 312, 314, 322, 332, and 342 (as shown at elements 316, 318, 326, 336, and 346), and has the value "Out" for registration entry 324 (as shown at element 328). (Alternatively, other values such as "Available" and "Unavailable", or equivalent representations thereof such as a binary flag having the values 1 and 0, may also be used.) The second part specifies a condition, such as a time period or days of the week, which constrains availability of the mechanism. Thus, status entry 316, 317 indicates that user 311 can be reached by his pager 24 hours per day, while he can only be reached by his cellular phone between the hours of 9 and 5 (status entry 318, 319). User 321's pager is only an alternative between 9 and 5, whereas his regular phone is an alternative except during the hours between 8 and 6 (see elements 326, 327 and 328, 329).

In a third optional aspect of the present invention, it may be desirable to allow multiple constraints to be specified for one mechanism, such as various periods throughout the day when the alternative mechanism is available. In this case, an appropriate technique such as specifying Boolean operators within a single registration status 303 or using multiple registration entries 302 may be used.

The technique with which evaluation of the constraint entries 303 is performed does not form part of the present invention. If the evaluation is performed in such a way that the first satisfied constraint is returned, then each of the entries in the registry for a particular user should be specified in order of most restrictive to least restrictive. For example, user 311's cellular phone entry 314, 315 should be specified before his pager entry 312, 313, to prevent the pager entry from always being selected.

Figure 4:
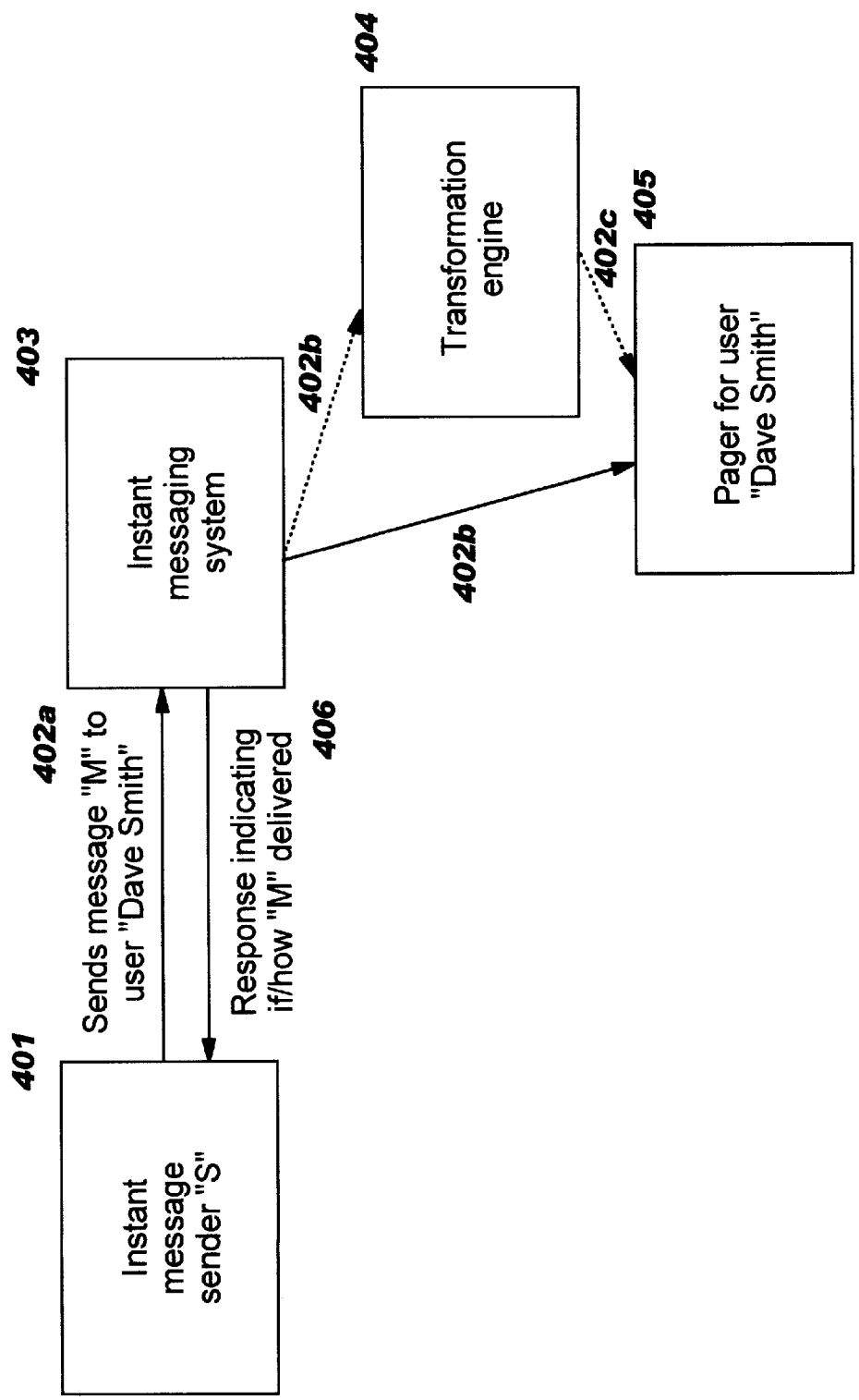
FIG. 4 shows an example message flow for a message delivered according to the extended IMS of the present invention.

FIG. 4 shows a high-level example of the message flows that occur with the IMS extension of the present invention. These flows are also applicable for the non-IMS-based sender scenario, where the element 403 is replaced by a wireless messaging system extended according to the fourth and fifth embodiments (i.e. an "EMS"). Sender S 401 wishes to send an instant message 402a to a particular recipient, who for this example is the user "Dave Smith" 311. Assume that this user is not logged on to an IMS at the time. In the prior art, the IMS would reject the message 402a, leaving sender 401 the options of not sending the message or finding some alternative way to contact user 311. According to the present invention, however, the extended IMS 403 receives the message 402a, and searches for alternative mechanisms for delivering the message 402a to user 311. The preferred embodiments of the technique with which the search for alternative mechanisms is performed are discussed below, with reference to FIGS. 5A–5G. Further assume that the extended IMS 403 locates user 311's entries in registry 300, indicating that user 311 can be reached by pager 24 hours per day (elements 312, 313, 316, 317) or by cellular phone between the hours of 9and 5 (elements 314, 315, 318, 319), and that the current time of day is 8 p.m. Thus, the entry registered for the pager will be used. The extended IMS 403 will forward message 402b to user 311's pager 405, using the registered address information 313.

As indicated at 404, the message 402b may optionally pass through a transformation engine before being delivered. This would be the case, for example, where the textual message 402a created by sender 401 is to be delivered through a non-textual mechanism such as a regular phone. Extended IMS 403 then forwards the message 402b through a text-to-speech transformation process 404 (such as a commercially-available voice synthesizer) on its way 402c to the destination device. When support for transformation engines of this type is provided in an implementation of the present invention, selection of the transformation engine to be used for a particular registered mechanism is preferably performed by consulting a previously-stored lookup table (or other stored information, such as an association coded directly into the extended IMS implementation or EMS implementation) whereby the mechanism type is associated with the transformation engine to be used.

Message flow 406 indicates that the sender 401 will preferably be informed when an alternative message delivery mechanism, other than the instant delivery of the IMS, has been used. Further, this message 406 will preferably notify the sender as to which alternative mechanism was used.

Figure 5A:
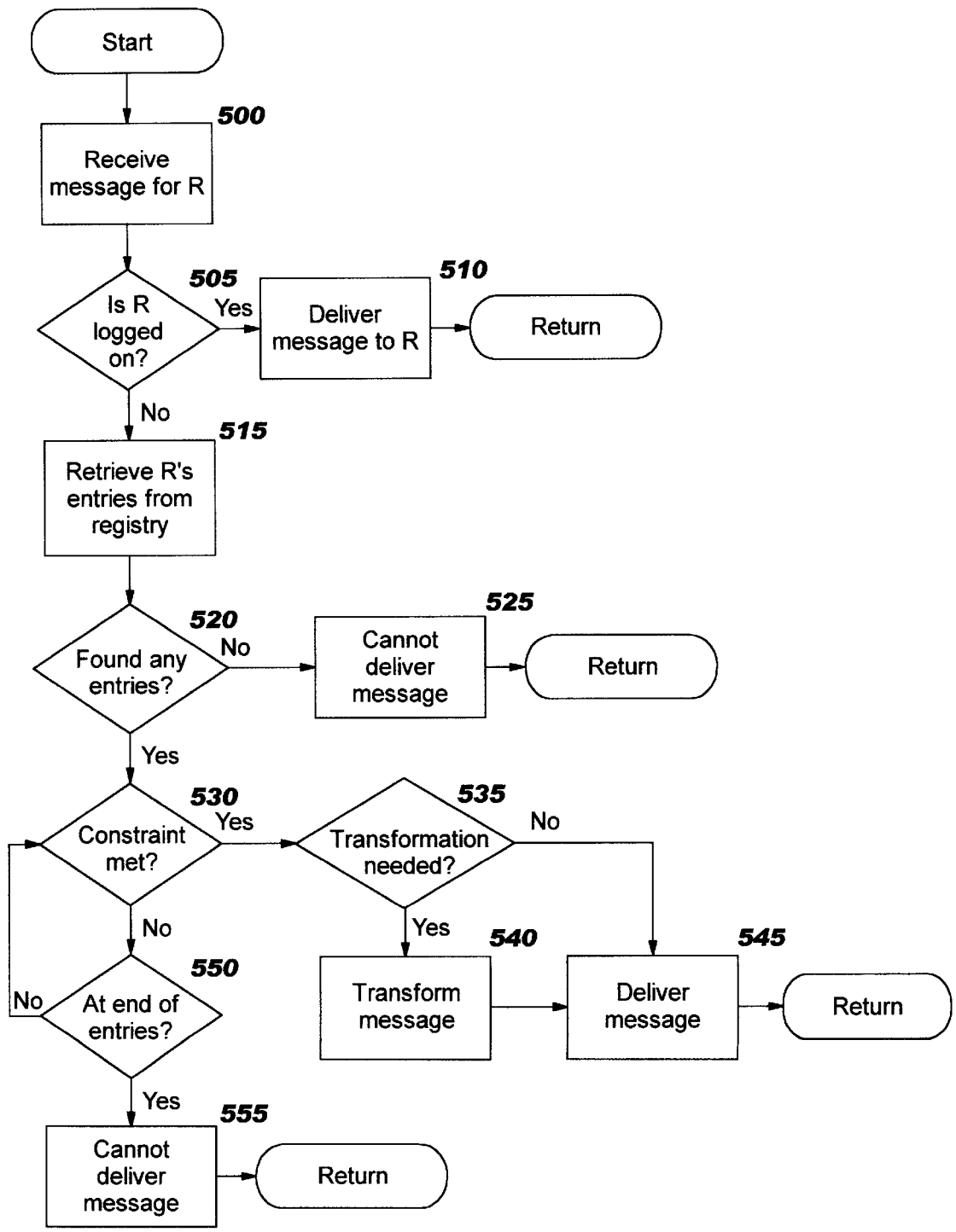

FIG. 5A, below, describes the logic used for implementing this technique for the extended IMS of the first preferred embodiment. The fourth preferred embodiment is similar to the first, with a significant difference being that the sender is not using an IMS. The sender's message is received at the EMS, and forwarded by the EMS if the recipient is reachable on a registered mechanism (including an IMS). FIGS. 5F1 and 5F2 describe the logic used for implementing this fourth preferred embodiment.

In a second preferred embodiment, instead of programmatically selecting an alternative mechanism from the registry 300, the extended IMS 403 may determine the available alternative delivery mechanisms, and present them to the sender 401. Appropriate icons or text may be used to represent the choices, such as a graphical representation of a regular phone or pager, etc. In this embodiment, the sender then has the option of selecting one of the alternatives that he finds most suitable, or deciding to cancel the message. As will be obvious, additional message flows between the sender 401 and extended IMS 403 occur for this embodiment. This embodiment requires software that is specific to the present invention to be residing on the sender's device, for: receiving a set of alternative mechanisms from the extended IMS; presentation of these alternatives to the sender; allowing the sender to select from the alternatives; and forwarding the selected choice to the extended IMS. (This embodiment is described below in terms of how FIGS. 5B and 5C modify the logic of FIG. 5A.)

In a third preferred embodiment, instead of allowing the sender to choose from the recipient's available alternative mechanisms (as in the second preferred embodiment), the extended IMS 403 determines which alternative would be used for a particular message delivery, and notifies the sender that this alternative will be used. The sender may then choose between having the message delivered using this mechanism, or not sending the message. As described for the second preferred embodiment, appropriate icons or text may be used to represent the alternative mechanism to the sender, and additional message flows between the sender 401 and extended IMS 403 occur for this embodiment. This third embodiment also requires software that is specific to the present invention to be residing on the sender's device, for: receiving information identifying a particular alternative mechanism from the extended IMS; presentation of this alternative to the sender; allowing the sender to choose to use this alternative; and subsequently forwarding the message to the extended IMS. (This third embodiment is described below in terms of how FIG. 5D modifies the logic of FIG. 5A, and also makes use of FIG. 5B.)

In the fifth preferred embodiment, a sender using a wireless messaging system may wish to know if and how a recipient is reachable before sending a message (or deciding whether to send a message) to this recipient. The sender issues a status request for a recipient, for example by clicking on a graphical icon associated with the recipient on the sender's display. This request is then received at the EMS, which determines the recipient's availability and returns that information to the sender. (This fifth embodiment is described below with reference to FIG. 5G.)

FIG. 5A depicts a flow chart which sets for the logic that may be used to implement the first preferred embodiment of the present invention. The logic of this flow chart represents the processing performed by the extended IMS of the present invention for each incoming message, using programmatic selection of an alternative message delivery mechanism. The process begins at Block 500, where a message is received from a sender. At Block 505, a test is made to determine whether the target message recipient is currently logged on to an IMS. If this test has a positive result, then the message is sent at Block 510 (as in the prior art), and the process of FIG. 5 ends. Otherwise, control transfers to Block 515.

At Block 515, the registry of alternative mechanisms is checked to see if any entries have been registered for this recipient. As stated previously, the recipient's name or other identifier is preferably used to access the registry. Block 520 then checks to see if any registered alternatives were located for this user. If this test has a negative result, then the message cannot be sent. An error message or other notification will be returned to the sender by Block 525, after which the processing of FIG. 5 ends. Otherwise, control transfers to Block 530.

Block 530 begins an iterative process through the one or more registered alternative mechanisms, checking to see if any constraints registered with a particular mechanism have been met. In the first preferred embodiment (as well as the third preferred embodiment, to be discussed below with reference to FIG. 5D), this iterative checking process ends with the first successful match. (FIG. 5C presents the second preferred embodiment discussed above, where each available alternative is presented to the user.) If a successful match is found at Block 530, control transfers to Block 535. Block 535 then asks whether any transformations (such as text to voice, as discussed above) need to be performed before delivering this message using the alternative delivery mechanism. If so, then control transfers to Block 540 where the appropriate transformation engine is invoked. When the message has been transformed, or when Block 535 has a negative result, control reaches Block 545 where the message is delivered to the recipient using the selected alternative mechanism. The processing of FIG. 5 then ends.

When the constraint being checked at Block 530 was not met, control reaches Block 550. Here, a test is made to see if the alternative mechanism being evaluated was the last registered alternative. If so, then the message cannot be delivered, and an error message or other notification will be returned to the sender at Block 555 (or, equivalently, by transferring control to Block 525). Otherwise, when there are more constraints to evaluate, control returns from Block 550 to Block 530. The evaluation process will then continue until either a constraint is successfully matched, or no more registration entries exist.

Note that the logic depicted in FIG. 5 supports the aspects which were described above as being optional for the preferred embodiments. It will be obvious to one of ordinary skill in the art how the logic of FIG. 5 can be modified to remove support for one or more optional aspects, should that be desired in a particular implementation. Further note that the logic of FIG. 5 is directed toward delivering a message to a single recipient. It may be desirable to allow messages to be delivered to multiple recipients, each of which may use a different alternative delivery mechanism. It will be obvious how this logic may be modified to support message delivery to more than one recipient.

Figure 5B:
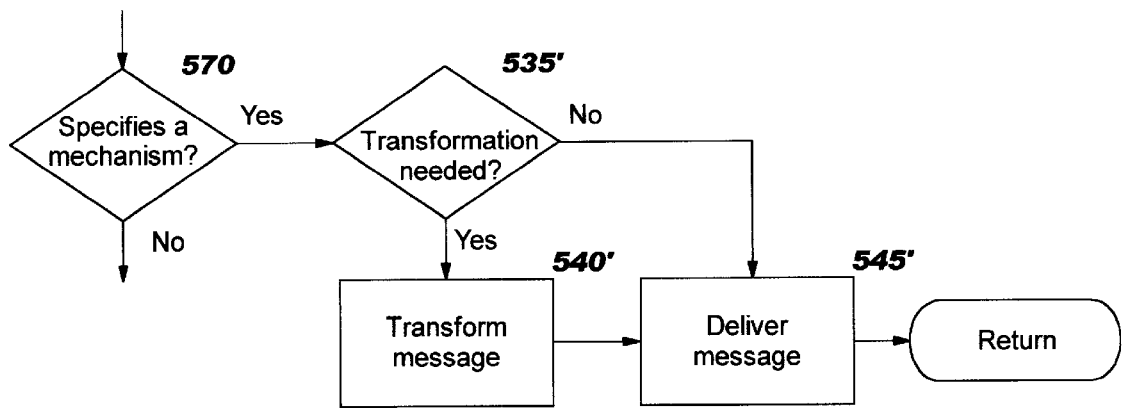
Figure 5C:
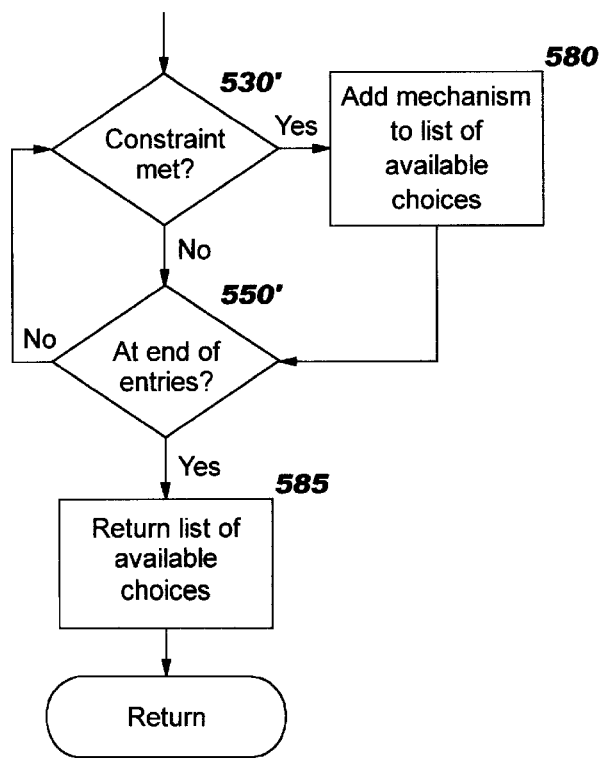

FIGS. 5B and 5C depict the logic that may be used in the second preferred embodiment, to augment the logic of FIG. 5A in order to provide sender control over which alternative message delivery mechanism is used. The logic of FIG. 5B would be inserted between Blocks 505 and 515 of FIG. 5A, such that after receiving a message (Block 505), a check is made by Block 570 to see if this message specifies the sender's selection of mechanisms. If it does, then control transfers to Block 535' to determine how to send the message using this mechanism. (The processing of Blocks 535', 540', and 545' is identical to that described for Blocks 535, 540, and 545 of FIG. 5A.) Otherwise, it can be assumed that this is the sender's original message (i.e. the extended IMS has not yet notified the sender that an alternative mechanism is needed), and control will continue to Block 515 to begin determination of the available choices. FIG. 5C depicts the logic used in this second embodiment to replace Blocks 530 through 555 of FIG. 5A. The processing of Block 530' is identical to that of Block 530 of FIG. 5A, which determines whether the constraint for the alternative being evaluated is met, except for the transfer of control upon detecting a positive result. When Block 530' has a positive result (i.e. the constraint is met), then Block 580 adds this mechanism to a list of available choices. The information in the list comprises the mechanism type, and may also include the registered address information and constraint information for recipient R. Control then transfers to Block 550', which functions in the same manner previously described for Block 550 of FIG. 5A, except for the processing of the positive result case (i.e. when the last registered entry for the target recipient has been evaluated). When the result is positive, Block 585 returns the list of available choices (created by one or more executions of Block 580) to the sender. (As stated previously, the sender may select from this list, and then transmit the message and his chosen mechanism to the extended IMS; this transmission will be processed according to the description of Block 570, above.) Processing of the logic in FIG. 5C then ends.

Figure 5D:
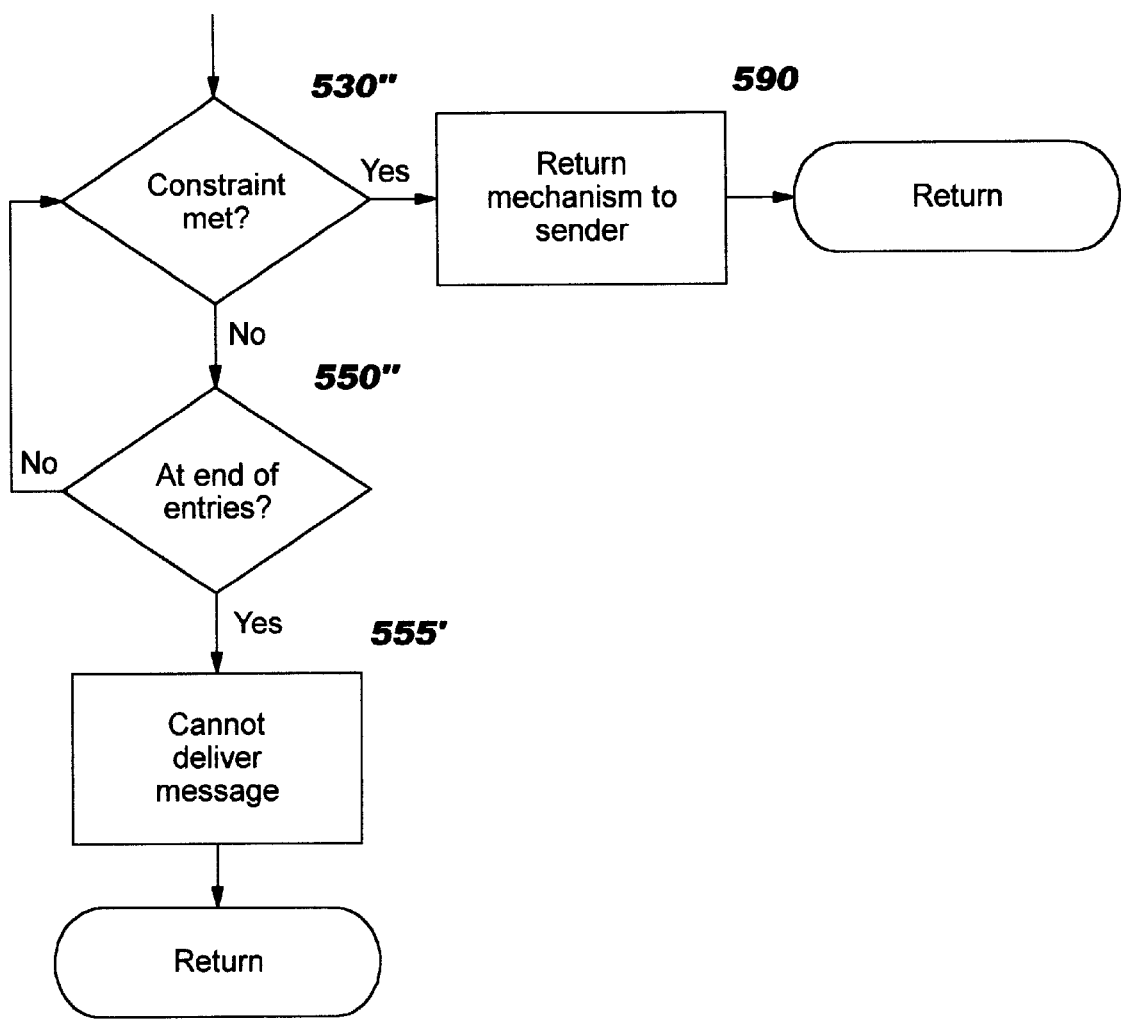

FIG. 5D, along with FIG. 5B, depicts the logic that may be used in a third preferred embodiment to augment the logic of FIG. 5A in order to provide a sender with information that an alternative mechanism will be used for a recipient, enabling the sender to choose whether to have the message delivered using that mechanism. As discussed above with reference to the second preferred embodiment, the logic of FIG. 5B would be inserted between Blocks 505 and 515 of FIG. 5A, to determine whether the incoming message specifies the alternative mechanism. FIG. 5B functions in the same manner for this third embodiment as has been described for the second embodiment.

FIG. 5D depicts the logic used in this third embodiment to replace Blocks 530 through 555 of FIG. 5A. The processing of Block 530" is identical to that of Block 530 of FIG. 5A, which determines whether the constraint for the alternative being evaluated is met, except for the transfer of control upon detecting a positive result. When Block 530" has a positive result (i.e. the constraint is met), then Block 590 returns an indication to the sender that this mechanism will be used if the message is sent. As described for the second embodiment, the information sent to the sender regarding an alternative comprises the mechanism type, and may also include the registered address information and constraint information for recipient R. After sending this information at Block 590, the processing of FIG. 5D ends. When Block 530" has a negative result, the further processing of Blocks 550" and 555' occurs in a manner identical to that described earlier for Blocks 550 and 555. Processing of the logic in FIG. 5D then ends.

Figure 5E:
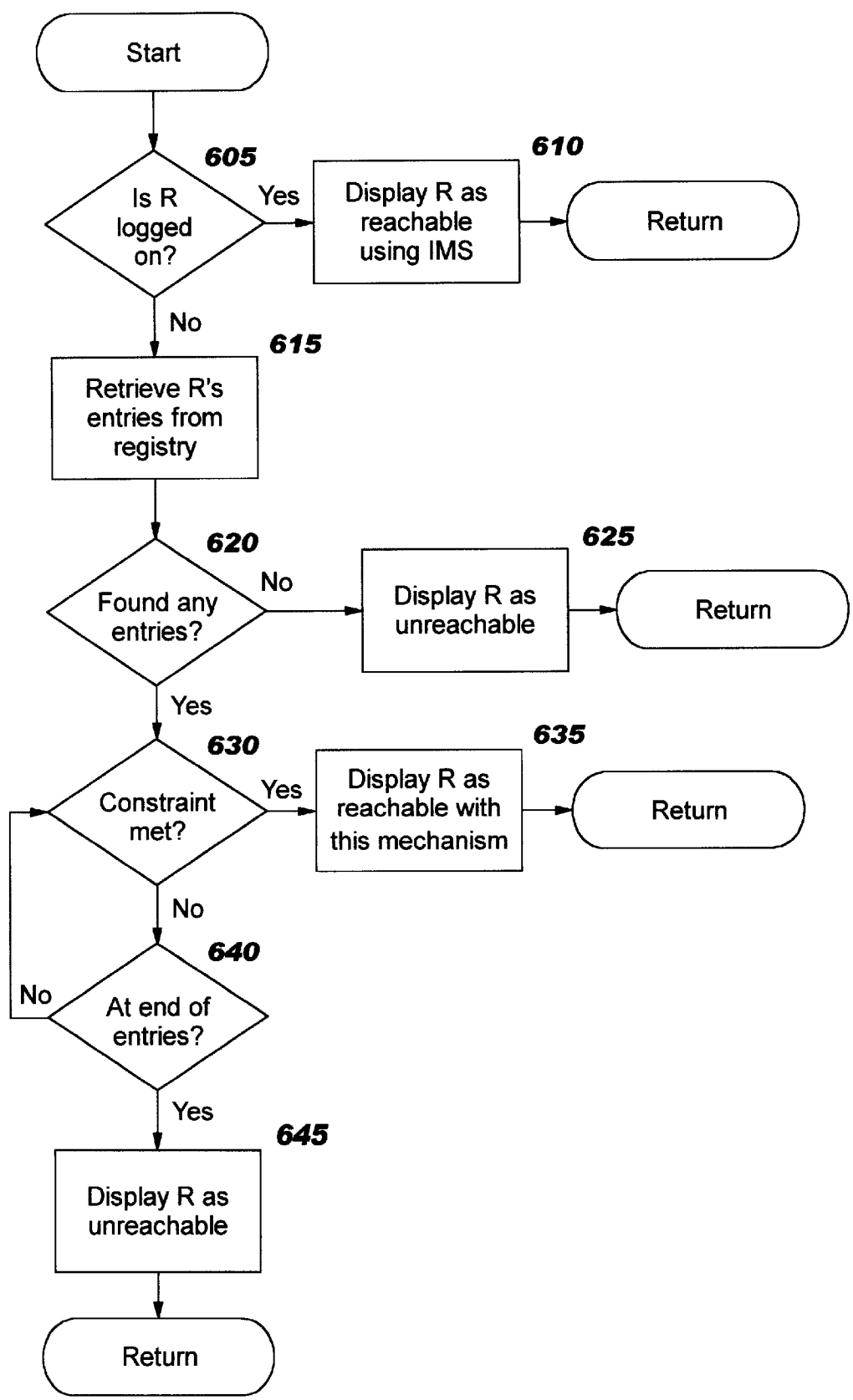
Figure 5G:
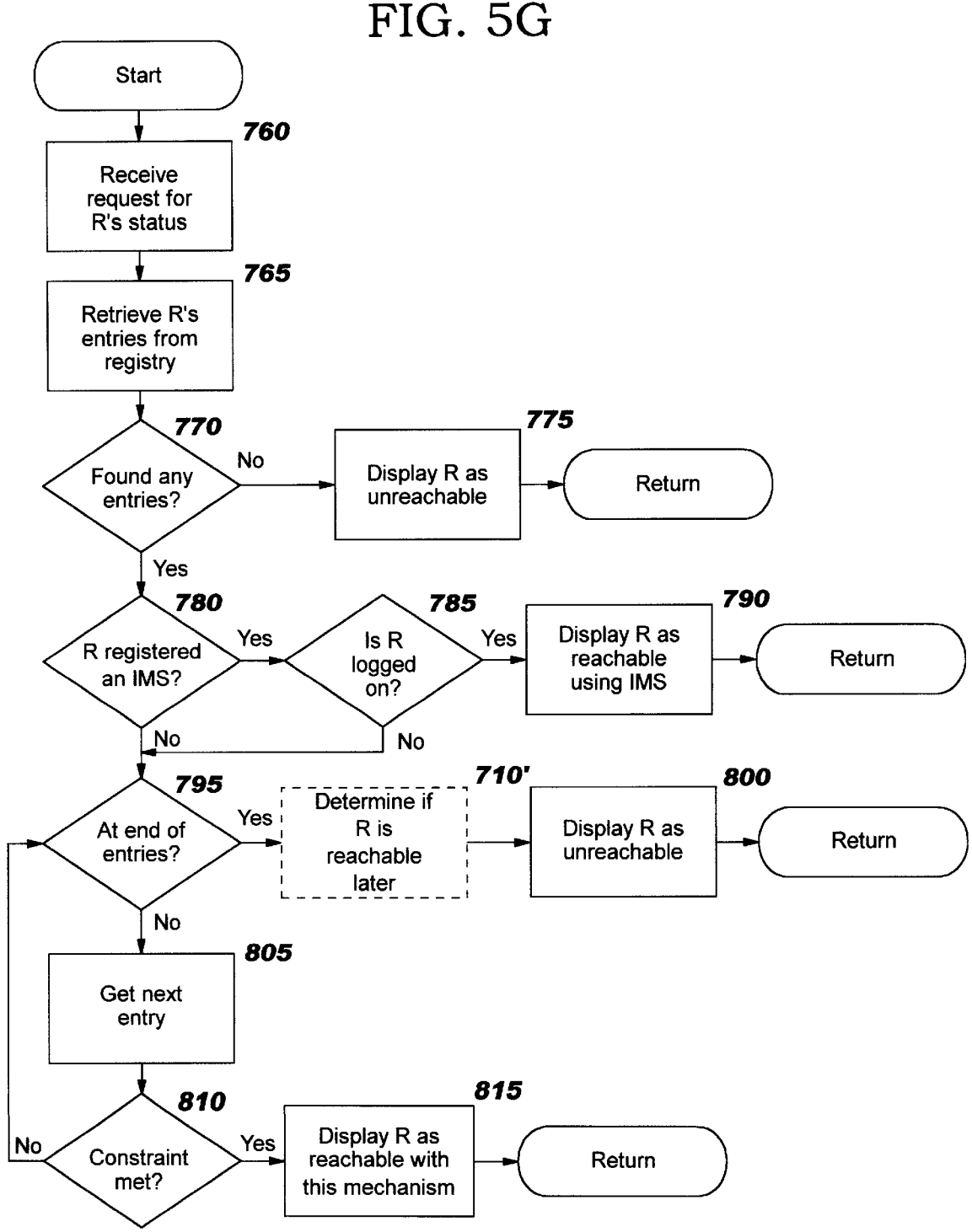

The processing of FIGS. 5A through 5D and 5F uses a message-driven approach to determining the availability of a particular recipient R. In an alternative approach, it may be preferable to determine availability of all the users (or selected users) typically represented on a sender's IMS display (i.e. all the users listed in the address book or other directory used for this sender's IMS), and refresh the user's display so that the availability status is displayed without regard to whether the sender is creating (or has created) a message to be delivered. The logic with which this alternative approach may be implemented for an IMS environment is depicted in FIG. 5E; FIG. 5G depicts an analogous capability for a non-IMS-based sender using a wireless messaging system. (Note that FIG. 5E depicts only the logic used to obtain the display-refreshing information; the logic with which an incoming message is handled at the IMS preferably uses the first preferred embodiment as depicted in FIG. 5A. Similarly, FIG. 5G depicts only the logic for retrieving a recipient's availability information; if a message is sent to this recipient, it is preferably handled according to the logic of FIG. 5F.)

The processing of FIG. 5E may be initiated in a timer-driven manner, or in an event-driven manner. When a timer is used, it will preferably be set to a relatively short period, to enable the display to be refreshed often enough to detect availability changes in near real-time. When the initiation is event-driven, the events will preferably be changes in the result of evaluating constraints for the registered users (such as passing from a time period when a particular recipient has no available alternative delivery mechanism into a time period where a constraint is met for this recipient's registered alternative mechanisms, thus making the recipient now reachable). Alternatively, the event may be receipt of a sender-initiated request for availability information.

The processing of FIG. 5E will preferably be repeated for each registered user. The processing for an individual user, referred to as recipient R, begins at Block 605 which checks to see if this recipient is currently logged on. If so, then Block 610 indicates that this user will be displayed to the sender as reachable using an IMS (in the same manner used in existing instant messaging systems). Otherwise, Block 615 retrieves the entries for R from the registry. If none were located, then Block 620 has a negative result, and Block 625 indicates that this recipient will be displayed to the sender as unreachable. If entries were located for R, then processing continues at Block 630. Blocks 630 and 640 represent an iterative evaluation of the registered constraints, as in FIG. 5A, that ends when (i) a matching constraint is found (after which control transfers to Block 635), or (ii) the last constraint has been evaluated without locating a match (transferring control to Block 645). If control reaches Block 635, the sender's display will indicate (using, e.g., an appropriate icon and perhaps additional information as previously discussed) the mechanism through which the recipient is currently reachable. If control reaches Block 645, on the other hand, the sender's display will indicate that this recipient is not reachable.

FIGS. 5F1 and 5F2 depict a programmatic delivery mechanism selection of the fourth preferred embodiment, initiated on an EMS in response to receiving a message from a sender. (By inspection, it can be seen that the flowchart presented in these figures is very similar to that of FIG. 5A. Thus, the following description of FIG. 5F omits the detailed processing description, such as explanation by use of examples, for blocks which have analogous counterparts in FIG. 5A.)

Upon receiving an incoming message at Block 660 of FIG. 5F1, the process immediately consults the registry (Block 665). If there are no registered entries at all for this recipient, then Block 680 notifies the sender that the message could not be delivered. Otherwise, when registered entries were located, Block 685 asks whether one of them was an IMS. This mechanism is treated separately from other mechanisms by the logic of FIG. 5F1 to emphasize a preference for sending the message through an "instant" mechanism when one is available. (Note that this preference is optional, and that a registered IMS could alternatively be handled in the same manner as other registered mechanisms by omitting Blocks 685 through 700.) If an IMS is registered, Block 690 checks to see if the recipient is currently logged on to this IMS. If not, control returns to Block 705; otherwise, the message is delivered using the IMS (Block 695) and the sender is so informed by returning an indication at Block 700.

Blocks 705, 720 and 725 perform an iterative process of evaluating registered entries, as has been described. Block 710 presents an optional aspect whereby, upon determining that R is not currently reachable using any of his registered alternatives, it may be desirable to determine—from the registry—whether R is reachable at a later time. For example, a sender may be trying to contact a service technician or delivery person. Rather than simply informing the sender that he cannot currently reach this recipient, Block 710 provides for conveying when the sender might "try again". This process comprises evaluating the constraints for R's registered entries, obtaining one or more times (and mechanisms) with which R may subsequently be available. Block 715 notifies the sender that his message could not be sent at this time, and when Block 710 is implemented, further notifies the sender of R's subsequent availability status.

When a matching constraint is found in Block 725, control transfers to Block 730 of FIG. 5F2. Blocks 730 and 735 indicate that optional transformations may be performed, as previously described. The message is delivered on the selected mechanism at Block 740. If this delivery service provides delivery confirmation (Block 745), the EMS may optionally choose to await confirmation (Block 750) before notifying the sender of the message delivery (and, preferably, the mechanism used) at Block 755.

FIG. 5G, representing the fifth preferred embodiment, depicts the logic with which a sender using a wireless messaging service can request the EMS of the present invention to provide the sender with availability information for a user (or perhaps users). This technique is similar to that depicted in FIG. 5E.

Upon receiving the status request (Block 760), the registry is consulted (Block 765). As in FIG. 5F, if there is no registered information for user "R", the sender will be informed that R is unreachable (Block 775). Otherwise, Blocks 780 and 785 determine if R is currently reachable by a registered IMS; if so, this information is conveyed to the user at Block 790. (As discussed with reference to FIG. 5F1, the preferential handling for an IMS at Blocks 780 through 790 is optional, and could be omitted.) Blocks 795, 805, and 810 iteratively loop through the registered entries, as has been described, to determine if a registered mechanism is currently available. If not, then optionally, the processing of Block 710' (as described for Block 710 of FIG. 5F1) may be performed prior to returning an indication to the sender (Block 800) that R is currently unreachable (where the optional Block 710' processing provides for also informing the sender when R may be available later). When a matching constraint was found, the sender is notified of this mechanism at Block 815.

As has been demonstrated, the present invention discloses advantageous techniques for extending messaging systems. Thus, use of the present invention enables an IMS-based sender's message to be delivered even though the intended receiver is not currently logged on to an instant messaging system, provided that an alternative messaging mechanism for the recipient is registered (and any constraints for this alternative are satisfied). Use of the present invention also enables a sender using a wireless messaging service to have the extended real-time awareness that is an aspect of instant messaging systems, and enables messages to be sent from this sender based on alternative delivery mechanisms for which a recipient has registered his availability.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product embodied on a computer-readable medium in a computing environment for enabling an instant messaging system (IMS) to use alternative message delivery mechanisms, comprising:

a message sender;

one or more message recipients;

a registry comprising an entry for one or more of said message recipients, wherein each of said entries comprises: (i) an alternative message delivery mechanism, and (ii) addressing information for said alternative;

computer-readable program code means for receiving, from said message sender, a message to be delivered to a selected one of said message recipients;

computer-readable program code means for determining, by said IMS, whether said selected one is currently logged on to said IMS or another IMS;

computer-readable program code means for delivering said message to said selected one when said computer-readable program code means for determining has a positive result; and computer-readable program code means for forwarding said message on a particular alternative delivery mechanism associated with said recipient when said computer-readable program code means for determining has a negative result and when said particular mechanism is available.

2. The computer program product according to claim 1, wherein said computer-readable program code means for forwarding further comprises:

computer-readable program code means for retrieving an associated entry from said registry using an identifier of said selected one; and computer-readable program code means for delivering said message to an address of said particular mechanism from said retrieved entry.

3. The computer program product according to claim 2, wherein said entry in said registry further comprises a constraint associated with said alternative message delivery mechanism, said constraint specifying a condition for use of said associated mechanism, and wherein said computer-readable program code means for forwarding further comprises:

computer-readable program code means for verifying whether said condition from said retrieved entry is met; and computer-readable program code means for determining that said particular mechanism is available only when said condition is met.

4. The computer program product according to claim 3, further comprising computer-readable program code means for rejecting said message when said particular mechanism is not available.

5. The computer program product according to claim 1, wherein said computer-readable program code means for forwarding further comprises computer-readable program code means for notifying said sender of said particular alternative, and wherein said computer-readable program code means for forwarding further requires that said sender accept said particular alternative.

6. A computer program product embodied on a computer-readable medium in a computing environment for enabling an instant messaging system (IMS) to use alternative message delivery mechanisms, comprising:

a message sender;

one or more message recipients;

a registry comprising an entry for one or more of said message recipients, wherein each of said entries comprises: (i) one or more alternative message delivery mechanisms, and (ii) addressing information for each of said alternatives;

computer-readable program code means for receiving, from said message sender, a message to be delivered to a selected one of said message recipients;

computer-readable program code means for determining, by said IMS, whether said selected one is currently logged on to said IMS or another IMS;

computer-readable program code means for delivering said message to said selected one when said computer-readable program code means for determining has a positive result; and computer-readable program code means for forwarding said message on a particular alternative delivery mechanism associated with said recipient when said computer-readable program code means for determining has a negative result and when said particular mechanism is available.

7. The computer program product according to claim 6, wherein said computer-readable program code means for forwarding further comprises:

computer-readable program code means for retrieving an associated entry from said registry using an identifier of said selected one; and computer-readable program code means for delivering said message to an address of said particular mechanism from said retrieved entry.

8. The computer program product according to claim 7, wherein said entry in said registry further comprises a constraint associated with each of said alternative message delivery mechanisms, each of said constraints specifying a condition for use of said associated mechanism, and wherein said computer-readable program code means for forwarding further comprises:

computer-readable program code means for iteratively evaluating each of said conditions from said retrieved entry until locating a match; and computer-readable program code means for using said mechanism associated with said matched condition as said particular mechanism.

9. The computer program product according to claim 8, further comprising computer-readable program code means for rejecting said message when none of said conditions are met.

10. The computer program product according to claim 6, further comprising:

computer-readable program code means for presenting available ones of said alternative delivery mechanisms to said sender when said computer-readable program code means for determining has said negative result;

computer-readable program code means for enabling said
sender to select from said presented ones; and
wherein said computer-readable program code means for
forwarding uses said selected one as said particular
mechanism.

11. The computer program product according to claim 6, wherein said computer-readable program code means for forwarding further comprises:
computer-readable program code means for selecting an available one of said registered alternative delivery mechanisms associated with said recipient; and
computer-readable program code means for notifying said sender of said available one; and wherein said computer-readable program code means for forwarding further requires that said sender accept said available one.

12. A system in a computing environment for enabling an instant messaging system (IMS) to use alternative message delivery mechanisms, comprising:
a message sender;
one or more message recipients;
a registry comprising an entry for one or more of said message recipients, wherein each of said entries comprises: (i) an alternative message delivery mechanism, and (ii) addressing information for said alternative;
means for receiving, from said message sender, a message to be delivered to a selected one of said message recipients;
means for determining, by said IMS, whether said selected one is currently logged on to said IMS or another IMS;
means for delivering said message to said selected one when said means for determining has a positive result; and
means for forwarding said message on a particular alternative delivery mechanism associated with said recipient when said means for determining has a negative result and when said particular mechanism is available.

13. The system according to claim 12, wherein said means for forwarding further comprises:
means for retrieving an associated entry from said registry using an identifier of said selected one; and
means for delivering said message to an address of said particular mechanism from said retrieved entry.

14. The system according to claim 13, wherein said entry in said registry further comprises a constraint associated with said alternative message delivery mechanism, said constraint specifying a condition for use of said associated mechanism, and wherein said means for forwarding further comprises:
means for verifying whether said condition from said retrieved entry is met; and
means for determining that said particular mechanism is available only when said condition is met.

15. The system according to claim 13, further comprising means for rejecting said message when said particular mechanism is not available.

16. The system according to claim 12, wherein said means for forwarding further comprises means for notifying said sender of said particular alternative, and wherein said means for forwarding further requires that said sender accept said particular alternative.

17. A system in a computing environment for enabling an instant messaging system (IMS) to use alternative message delivery mechanisms, comprising:
a message sender;
one or more message recipients;
a registry comprising an entry for one or more of said message recipients, wherein each of said entries comprises: (i) one or more alternative message delivery mechanisms, and (ii) addressing information for each of said alternatives;
means for receiving, from said message sender, a message to be delivered to a selected one of said message recipients;
means for determining, by said IMS, whether said selected one is currently logged on to said IMS or another IMS;
means for delivering said message to said selected one when said means for determining has a positive result; and
means for forwarding said message on a particular alternative delivery mechanism associated with said recipient when said means for determining has a negative result and when said particular mechanism is available.

18. The system according to claim 17, wherein said means for forwarding further comprises:
means for retrieving an associated entry from said registry using an identifier of said selected one; and
means for delivering said message to an address of said particular mechanism from said retrieved entry.

19. The system according to claim 18, wherein said entry in said registry further comprises a constraint associated with each of said alternative message delivery mechanisms, each of said constraints specifying a condition for use of said associated mechanism, and wherein said means for forwarding further comprises:
means for iteratively evaluating each of said conditions from said retrieved entry until locating a match; and
means for using said mechanism associated with said matched condition as said particular mechanism.

20. The system according to claim 19, further comprising means for rejecting said message when none of said conditions are met.

21. The system according to claim 17, further comprising:
means for presenting available ones of said alternative delivery mechanisms to said sender when said means for determining has said negative result;
means for enabling said sender to select from said presented ones; and
wherein said means for forwarding uses said selected one as said particular mechanism.

22. The system according to claim 17, further comprising:
means for receiving a multiple-recipient message from said sender, wherein said multiple-recipient message is to be delivered to more than one of said message recipients; and wherein:
said means for determining whether said selected one is currently logged on determines whether each of said message recipients is currently logged on to said IMS;
said means for delivering said message when said means for determining has said positive result delivers said message to each of said message recipients who is currently logged on; and
when said means for determining has said negative result, said means for forwarding said message on said particular alternative delivery mechanism forwards said message to each of said message recipients who is not currently logged using an available mechanism associated with each of said not-logged-on message recipients.

23. The system according to claim 17, wherein said means for forwarding further comprises:
- means for selecting an available one of said registered alternative delivery mechanisms associated with said recipient; and
- means for notifying said sender of said available one; and wherein said means for forwarding further requires that said sender accept said available one.

24. A method for enabling an instant messaging system (IMS) to use alternative message delivery mechanisms in a computing environment, comprising the steps of:
- providing a registry comprising an entry for at least one of one or more message recipients, wherein each of said entries comprises: (i) an alternative message delivery mechanism, and (ii) addressing information for said alternative;
- receiving, from a message sender, a message to be delivered to a selected one of said message recipients;
- determining, by said IMS, whether said selected one is currently logged on to said IMS or another IMS;
- delivering said message to said selected one when said determining step has a positive result; and
- forwarding said message on a particular alternative delivery mechanism associated with said recipient when said determining step has a negative result and when said particular mechanism is available.

25. The method according to claim 24, wherein said forwarding step further comprises the steps of:
- retrieving an associated entry from said registry using an identifier of said selected one; and
- delivering said message to an address of said particular mechanism from said retrieved entry.

26. The method according to claim 25, wherein said entry in said registry further comprises a constraint associated with said alternative message delivery mechanism, said constraint specifying a condition for use of said associated mechanism, and wherein said forwarding step further comprises the steps of:
- verifying whether said condition from said retrieved entry is met; and
- determining that said particular mechanism is available only when said condition is met.

27. The method according to claim 26, further comprising the step of rejecting said message when said particular mechanism is not available.

28. The method according to claim 24, wherein said forwarding step further comprises the step of notifying said sender of said particular alternative, and wherein said forwarding step further requires that said sender accept said particular alternative.

29. A method for enabling an instant messaging system (IMS) to use alternative message delivery mechanisms in a computing environment, comprising the steps of:
- providing a registry comprising an entry for at least one of one or more message recipients, wherein each of said entries comprises: (i) one or more alternative message delivery mechanisms, and (ii) addressing information for each of said alternatives;
- receiving, from a message sender, a message to be delivered to a selected one of said message recipients;
- determining, by said IMS, whether said selected one is currently logged on to said IMS or another IMS;
- delivering said message to said selected one when said determining step has a positive result; and
- forwarding said message on a particular alternative delivery mechanism associated with said recipient when said determining step has a negative result and when said particular mechanism is available.

30. The method according to claim 29, wherein said forwarding step further comprises the steps of:
- retrieving an associated entry from said registry using an identifier of said selected one; and
- delivering said message to an address of said particular mechanism from said retrieved entry.

31. The method according to claim 30, wherein said entry in said registry further comprises a constraint associated with each of said alternative message delivery mechanisms, each of said constraints specifying a condition for use of said associated mechanism, and wherein said forwarding step further comprises the steps of:
- iteratively evaluating each of said conditions from said retrieved entry until locating a match; and
- using said mechanism associated with said matched condition as said particular mechanism.

32. The method according to claim 31, further comprising the step of rejecting said message when none of said conditions are met.

33. The method according to claim 29, further comprising the steps of:
- presenting available ones of said alternative delivery mechanisms to said sender when said determining step has said negative result;
- enabling said sender to select from said presented ones; and
- wherein said forwarding step uses said selected one as said particular mechanism.

34. The method according to claim 29, further comprising the step of:
- receiving a multiple-recipient message from said sender, wherein said multiple-recipient message is to be delivered to more than one of said message recipients; and wherein:
- said determining whether said selected one is currently logged on step determines whether each of said message recipients is currently logged on to said IMS;
- said delivering said message when said determining step has said positive result step delivers said message to each of said message recipients who is currently logged on; and
- when said determining step has said negative result, said forwarding said message on said particular alternative delivery mechanism step forwards said message to each of said message recipients who is not currently logged using an available mechanism associated with each of said not-logged-on message recipients.

35. The method according to claim 29, wherein said forwarding step further comprises the steps of:
- selecting an available one of said registered alternative delivery mechanisms associated with said recipient; and
- notifying said sender of said available one; and wherein said forwarding step further requires that said sender accept said available one.

* * * * *